United States Patent [19]
Hermanns

[11] Patent Number: 5,823,460
[45] Date of Patent: Oct. 20, 1998

[54] METHOD AND DEVICE FOR DETERMINING THE DIAMETER OF A TEXTILE YARN CHEESE

[75] Inventor: Ferdinand-Josef Hermanns, Erkelenz, Germany

[73] Assignee: W. Schlafhorst AG & Co., Moenchengladbach, Germany

[21] Appl. No.: 880,280

[22] Filed: Jun. 23, 1997

[30] Foreign Application Priority Data

Jun. 26, 1996 [DE] Germany .................. 196 25 512.0

[51] Int. Cl.⁶ .................. B65H 63/08; G01P 3/66
[52] U.S. Cl. .................. 242/485.7; 324/178
[58] Field of Search .................. 242/18 R, 18 DD, 242/36, 39, 49, 485.6, 485.7; 324/178

[56] References Cited

U.S. PATENT DOCUMENTS

| | | | |
|---|---|---|---|
| 4,494,702 | 1/1985 | Miyake et al. | 242/18 R |
| 4,703,900 | 11/1987 | Noshi et al. | 242/39 X |
| 4,805,844 | 2/1989 | Hermanns et al. | 242/18 DD |
| 4,828,191 | 5/1989 | Rüge et al. | 242/18 R |
| 4,964,582 | 10/1990 | Hermanns et al. | 242/36 |
| 5,652,509 | 7/1997 | Weis | 324/178 X |

FOREIGN PATENT DOCUMENTS

| | | |
|---|---|---|
| 0 307 644 A2 | 8/1988 | European Pat. Off. . |
| 2 122 112 | 12/1971 | Germany . |
| 32 42 318 A1 | 6/1983 | Germany . |
| 36 18 856 A1 | 12/1987 | Germany . |
| 38 10 365 A1 | 10/1989 | Germany . |
| 42 25 842 A1 | 2/1994 | Germany . |
| 57-122306 | 7/1982 | Japan . |
| 4-369415 | 12/1992 | Japan . |
| 07280545 | 10/1995 | Japan . |
| 2 052 066 | 1/1981 | United Kingdom . |

OTHER PUBLICATIONS

*Geschwindigkeits–und Durchflussmessung mit Korrelationsverfahren*; F.mesch, Karlsrube; 1982; pp. 73–80.

Primary Examiner—Michael Mansen
Attorney, Agent, or Firm—Kennedy Covington Lobdell & Hickman LLP

[57] ABSTRACT

In order to determine the diameter or the radius of a textile yarn cheese during winding, two sensors are placed adjacent the cheese circumference at a fixed circumferential distance from each other to detect surface characteristics of the cheese, and their sensor signals are evaluated in a correlator to form running times. The circumferential velocity of the cheese is calculated by dividing the distance between the sensors by the running times, after which the circumferential velocity and the angular velocity of the cheese are divided to compute the diameter or radius of the cheese.

6 Claims, 2 Drawing Sheets

METHOD AND DEVICE FOR DETERMINING THE DIAMETER OF A TEXTILE YARN CHEESE

FIELD OF THE INVENTION

The present invention relates generally to a method and device for determining the diameter of a textile yarn cheese driven by a friction roller in peripheral surface contact with the cheese during its production. More particularly, the present invention relates to such a method and device wherein the angular velocity of the cheese is detected for purposes of evaluation utilizing a sensor which monitors rotation of the cheese.

BACKGROUND OF THE INVENTION

In the course of the production of textile yarn cheeses by means of bobbin winding devices of textile machines, in particular cheeses made with a random yarn winding technique, a yarn is continuously wound on an initially empty bobbin tube, so that the cheese slowly grows until a predetermined diameter has been reached. The yarn application per revolution of the cheese is extremely small in comparison with the total diameter of the cheese. The diameter or radius of the cheese is an essential characteristic which can be employed, for example, for terminating the winding process when a defined, predetermined diameter has been reached, and also to make an intervention in the winding process during the production of the cheese for obtaining a quality bobbin, for example, a bobbin with as constant a winding density as possible.

It is known from German Patent Publication DE 38 10 365 A1 to determine the radius of a cheese during its production on the basis of a division of the time period for revolution of the cheese by the time period for revolution of the friction roller. Additional arithmetic operations are also performed because of the extremely small increase of the diameter of the cheese during a single revolution, in order to obtain a meaningful result. The determination of the diameter or the radius of the cheese by employing the division of the length of the bobbin period by the length of the period of the friction roller requires that measurements are only taken in a slippage-free state, namely at a time when the circumferential velocities of the friction roller and the bobbin are the same. So-called pattern-disruption methods are performed in modern bobbin winding machines in order to prevent the winding of patterns. To this end a slippage in accordance with predetermined criteria is intentionally generated between the bobbin and the friction roller. The stronger the pattern removal in pattern zones is to be, the shorter are the periods in which a synchronized running of the friction roller and the cheese is present, i.e. a slippage-free status. This results in the diameter determination in accordance with the known methods becoming problematical.

OBJECT AND SUMMARY OF THE INVENTION

It is therefore an object of the invention to provide a method and device for determination of the diameter (or of the radius) of a textile yarn cheese even during its production, without requiring a slippage-free state between the friction roller and the cheese. Given that the mathematical relationship between geometric diameter and radius is so well-known, a determination computing a diameter value is treated for purposes of the present invention as inherently determining the corresponding radius, and vice versa.

This objective is achieved by the method of the present invention under which the diameter of the cheese is calculated by dividing the circumferential velocity of the surface of the cheese by the angular velocity of the cheese. In particular, the circumferential cheese velocity is calculated from sensor signals of two sensors, which are placed at a fixed distance from each other to detect surface characteristics of the cheese, by a running time correlation method.

This method makes use of a known mathematical equation, namely that the diameter (or the radius) are equal to the circumferential velocity divided by the angular velocity, and thus permits the determination of the diameter (or of the radius) of the cheese without requiring synchronized (slippage free) running of the friction roller and the cheese for the calculation operation.

Running time correlation methods are known from "Regelungs—technische Praxis" [Practical Control Techniques], vol. 1982, pp. 73 to 82, or from German Patent Publication DE 42 25 842 A1. The present method is based on the measurement of the running time made from statistically fluctuating signals which are provided by two sensors arranged at a fixed, and therefore known, distance from each other.

According to a further aspect of the present invention, a device is provided for carrying out the inventive method utilizing the two sensors placed about the circumference of the cheese at a fixed distance from each other in the circumferential direction of the cheese to detect surface characteristics of the cheese and utilizing an evaluation device containing a correlator to determine running times from the sensor signals, a first division member for determining the circumferential velocity of the cheese from the fixed distance of the sensors and the running times, and a second division member for calculating the cheese diameter from the division of the circumferential velocity and the angular velocity of the cheese.

In a further aspect of the invention, the two sensors are arranged in the vicinity of the contact point at which the cheese rests on the friction roller. In such area, the distance between the surface of the cheese and the two sensors does not significantly change after the cheese reaches a defined diameter value. To this end, it is particularly advantageous if the sensors are arranged at the side of the contact point facing away from the creel, which supports the cheese, because of the small change in the distance from the surface of the increasing bobbin.

Further advantages and characteristics of the invention will be recognized and appreciated from the following description of the embodiments represented in the drawings.

DETAILED DESCRIPTION OF THE PREFERRED EMBODIMENTS

Figure 1:
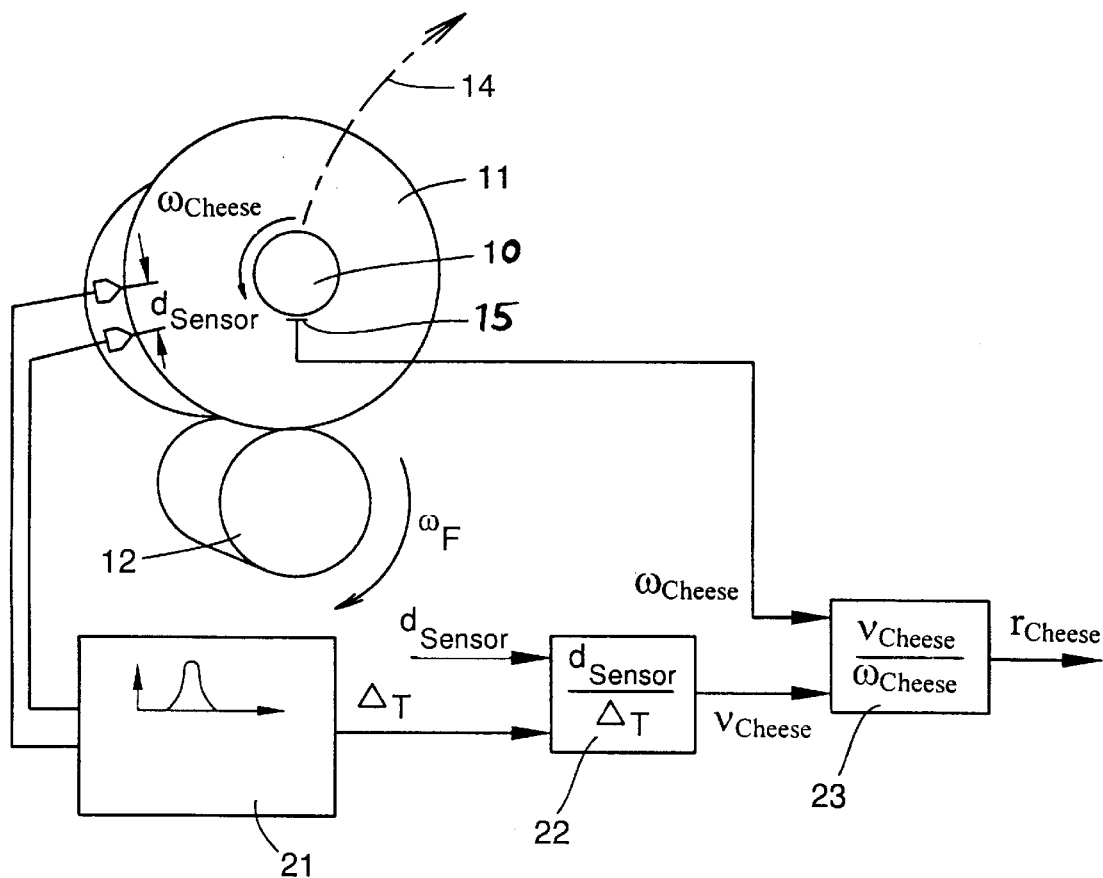
FIG. 1 is a schematic diagram representing a measuring and evaluation device in accordance with the present invention for detecting the diameter of a cheese in the course of its production.
Figure 2:
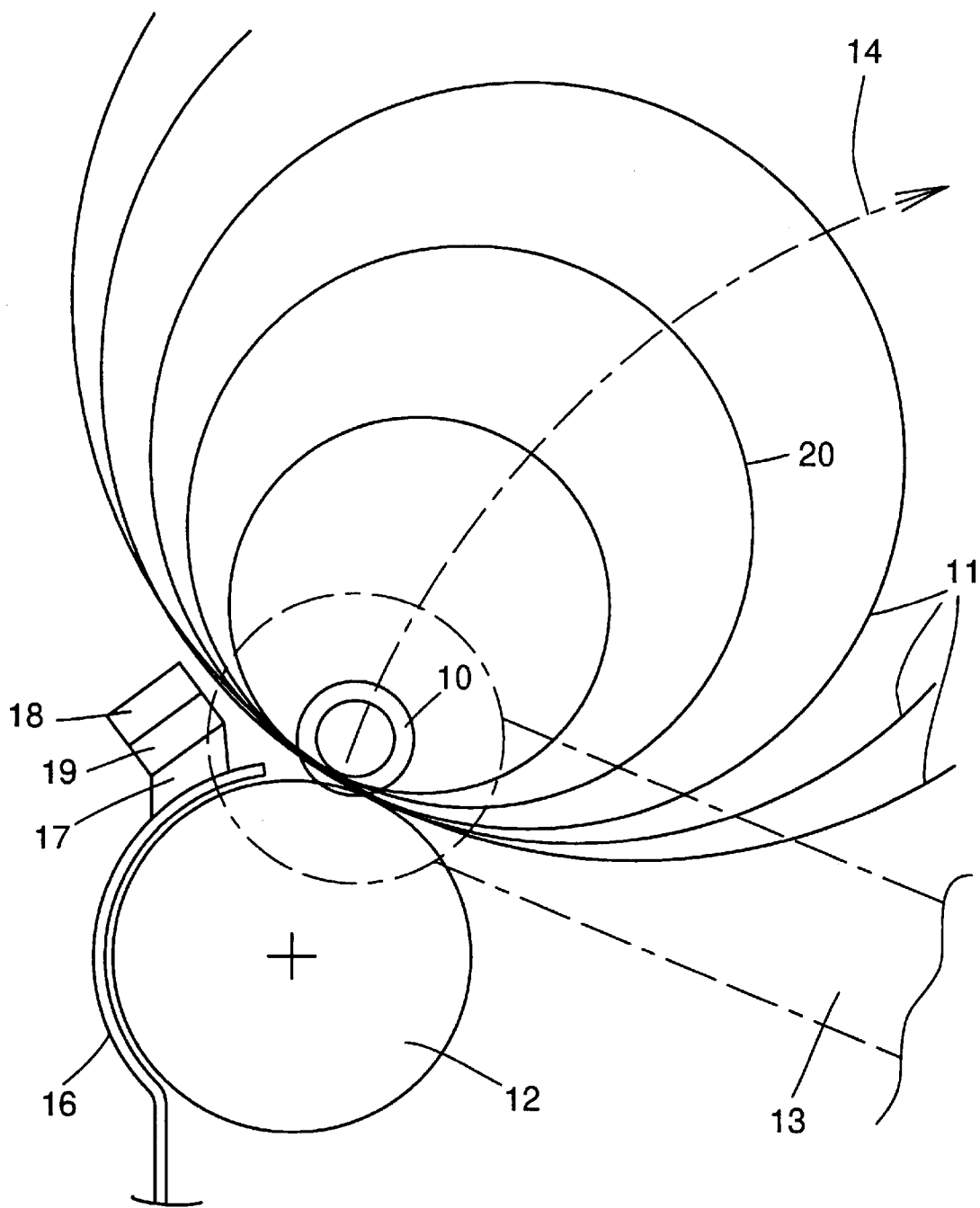
FIG. 2 is another diagram representing a friction roller and a cheese, depicting the increase in diameter of the cheese because of progressive winding application of a yarn or thread.

Referring now to the accompanying drawings of FIGS. 1 and 2, a bobbin winding device of a textile machine is schematically shown and basically operates to wind a thread or a yarn progressively about an initially empty bobbin tube 10 until a cheese 11 of a predetermined diameter has been produced. The initially empty bobbin tube 10, and the cheese 11 as it gradually grows in diameter, rest in peripheral surface contact on a friction roller 12 which is rotatably driven by a drive arrangement (not shown) and, in turn, drives the cheese 11. The friction roller is embodied, for example, in the form of a so-called grooved roller, provided with a single- or multi-flight circumferential groove, which acts as a traversing device to effect a traversing placement of the yarn on the bobbin tube 10 and on the yarn cheese 11.

The bobbin tube 10 is held by means of a creel 13 (FIG. 2) which is pivotable around an axis which is parallel with the axis of the tube 10 so that, as the diameter of the cheese 11 gradually increases, the tube 10 moves in an arcuate path 14 with respect to the pivot axis of the creel 13.

The creel 13 is provided with rotatably seated cone plates, which project into the tube 10 and rotate with it. An angle of rotation sensor 15 is assigned to these cone plates and emits a signal corresponding to the angular velocity $\omega_{cheese}$ of the cheese 11.

On the side of the tube 10 facing away from the creel 13, at which the yarn to be wound arrives, the friction roller 12 is partially covered by a deflection plate 16. Two sensors 18,19 are fixedly attached on the deflection plate 16 by means of a holder 17. As represented in FIG. 2, once the cheese 11 has grown to a defined diameter, the fixed sensors 18,19 are disposed in opposed facing relation to the yarn surface of the cheese 11 and the relative disposition and spacing therebetween changes only negligibly after the cheese 11 has attained the intermediate winding diameter 20.

The sensors 18,19 are arranged in the circumferential direction of the cheese 11 at a fixed distance $d_{Sensor}$ (FIG. 1). The sensors 18,19 operate to detect irregularities in the yarn surface of the cheese 11 and to form signals as a function thereof. For example, the sensors 18,19 are optical reflection sensors.

The sensor signals are supplied to a running time correlator 21 which is constructed, for example, as described in "Regelungstechnische Praxis" [Practical Control Techniques], vol. 1982, pp. 73 to 82, "Geschwindigkeits- und Durchflußmessung mit Korrelationsverfahren" [Velocity and Flow Measurements by Means of Correlation Methods] by F. Mesch. The running time correlator 21 forms running times ΔT from the statistically fluctuating sensor signals. These running times ΔT are supplied to a division member 22, which calculates the circumferential velocities $U_{Cheese}$ of the surface of the cheese 11 by dividing the sensor distance $d_{Sensor}$ by the running times ΔT. The circumferential velocities $U_{Cheese}$ and the angular velocities $\omega_{Cheese}$ are provided to a further division member 23, which divides the circumferential velocities $U_{Cheese}$ by the angular velocities $\omega_{Cheese}$ and in this way calculates the instantaneous radius $r_{Cheese}$ (or alternatively the instantaneous diameter) of the cheese 11.

Thus, starting at a defined bobbin diameter, the radius $r_{Cheese}$ (or the diameter) of the cheese 11 is continuously and very exactly determined by means of the device of the present invention, wherein signals detected at the cheese 11 are exclusively employed. Thus the measurement is independent of, and unaffected by, the presence or absence of slippage between the friction roller 12 and the cheese 11.

The instantaneous radius $r_{Cheese}$ (or the diameter) of the cheese 11, which is continuously determined in the course of the production of the cheese 11, can be utilized for the purpose of evaluating the necessity or desirability of intervening in the winding process. For example, it is possible to regulate the winding process to achieve as constant as possible a diameter increase per bobbin revolution in order to obtain as constant as possible a bobbin density. To this end a set value for the diameter increase per bobbin revolution is preset, which is compared with the diameter increase calculated from the detected diameters. A regulation of the diameter increase to the set value can be performed for example by changing the tension with which the yarn travels to the cheese 11. This can be performed by changing the circumferential velocity of the friction roller appropriately, and/or by changing the effect of a yarn tensioning element provided upstream of the friction roller. In the same manner, it would also be possible to change the load on the creel 13, i.e. the pressure force with which the cheese 11 rests on the friction roller 12.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for determining the radius of a cheese while being surface driven by a friction roller during production of the cheese, comprising:

(a) determining the angular velocity of the cheese by sensing rotation of the cheese over time;
   (b) determining the circumferential velocity of the cheese by
      (i) detecting surface characteristics of the cheese using a first sensor and generating a first signal as a function of said determined surface characteristics:
      (ii) detecting the same surface characteristics of the cheese using a second sensor and generating a second signal corresponding to the first signal as a function of said determined surface characteristics, the second sensor being disposed from the first sensor along a fixed circumferential distance:
      (iii) correlating the first signal with the second signal thereby determining a time difference between the corresponding signals, and then
      (iv) dividing the time difference by the fixed distance between the sensors to thereby arrive at the circumferential velocity of the cheese; and
   (c) dividing said determined circumferential velocity of the cheese by said determined angular velocity of the cheese to thereby arrive at the radius of the cheese.

2. A device for determining the radius of a cheese while being surface driven by a friction roller during production of the cheese, comprising:

means for detecting the angular velocity of a component rotating with the cheese;
   two sensors disposed adjacent the circumference of the cheese at a fixed circumferential distance from each other for detecting surface characteristics of the cheese and generating signals as a function of the detected surface characteristics;

a signal correlating member connected to said sensors for receiving signals therefrom, said signal correlating member correlating signals from said first sensor with signals from said second sensor for determining time differences between corresponding signals from said sensors;

a division member for calculating a circumferential velocity from the fixed distance between the sensors and the time differences; and a division member for calculating the radius by division of the circumferential velocity of the cheese by the angular velocity of the cheese.

3. The device in accordance with claim 2, wherein the two sensors are arranged in the vicinity of the contact point at which the cheese rests on the friction roller.

4. The device in accordance with claim 3, wherein a creel located at one side of the contact point supports the cheese in resting contact on the friction roller and the sensors are disposed on the opposite side of the contact point from the creel.

5. The device in accordance with claim 4, further including a friction roller deflection plate, said sensors being fixed on said deflection plate.

6. The device in accordance with claim 2, wherein said sensors are optical reflection sensors.

* * * * *